United States Patent
Yang et al.

(10) Patent No.: US 11,834,339 B2
(45) Date of Patent: Dec. 5, 2023

(54) METHOD FOR PREPARING AMORPHOUS SILICON POWDER FOR ANODE MATERIAL OF LITHIUM ION BATTERY

(71) Applicants: CHINA THREE GORGES UNIVERSITY, Yichang Hubei (CN); REAL-CELL NEW ENERGY TENCHNOLOGY CO., LTD., Yichang (CN)

(72) Inventors: Xuelin Yang, Yichang Hubei (CN); Guo Chen, Yichang Hubei (CN); Lulu Zhang, Yichang Hubei (CN)

(73) Assignees: CHINA THREE GORGES UNIVERSITY; OCELL NEW ENERGY TECHNOLOGY CO., LTD.

( * ) Notice: Subject to any disclaimer, the term of this patent is extended or adjusted under 35 U.S.C. 154(b) by 0 days.

(21) Appl. No.: 17/717,560

(22) Filed: Apr. 11, 2022

(65) Prior Publication Data
US 2022/0332588 A1     Oct. 20, 2022

(51) Int. Cl.
*C01B 33/023*     (2006.01)
*H01M 10/0525*     (2010.01)

(52) U.S. Cl.
CPC ........ *C01B 33/023* (2013.01); *H01M 10/0525* (2013.01); *C01P 2002/02* (2013.01); *H01M 2220/20* (2013.01)

(58) Field of Classification Search
CPC ............ C01B 33/023; H01M 10/0525
See application file for complete search history.

(56) References Cited

U.S. PATENT DOCUMENTS

| | | | | | |
|---|---|---|---|---|---|
| 3,010,797 | A | * | 11/1961 | Aries | .......... C01B 33/027 423/350 |
| 2020/0411852 | A1 | * | 12/2020 | Zhang et al. | .......... H01M 4/38 49/366 |

FOREIGN PATENT DOCUMENTS

| | | | | |
|---|---|---|---|---|
| CN | 104556040 A | | 4/2015 | |
| CN | 107735888 A | | 3/2017 | |
| CN | 108666560 A | * | 10/2018 | ........ H01M 10/0525 |
| CN | 108666560 A | | 10/2018 | |
| CN | 109081350 A | | 12/2018 | |

(Continued)

OTHER PUBLICATIONS

Shoichi et al.—FOR_May 22, 2022 English Translation (Year: 1987).*

(Continued)

*Primary Examiner* — Anthony J Zimmer
*Assistant Examiner* — Jordan W Taylor

(57) ABSTRACT

A method for preparing an amorphous silicon powder for an anode material of a lithium-ion battery is disclosed. The amorphous silicon powder is prepared by reducing an oxide of silicon, wherein an X-ray diffraction peak of an amorphous silicon material is weak, and the amorphous silicon material is of an amorphous structure. A structural formula of the oxide of silicon is $SiO_x$, wherein $0<x\leq 2$. The reduction refers to vapor phase reduction, a vapor phase reduction atmosphere is a mixed gas of hydrogen and carbon monoxide, a reduction temperature ranges from 100° C. to 700° C., and a reduction time ranges from 2 h to 72 h.

1 Claim, 3 Drawing Sheets

(56) References Cited

FOREIGN PATENT DOCUMENTS

JP            S62123009 A  *  6/1987  ............. C01B 33/02

OTHER PUBLICATIONS

Lee et al. Current Applied Physics 2010, 10, S218-S221 (Year: 2010).*
First Notification of Office Action by China National Intellectual Property Administration, dated Feb. 16, 2022.
Notice of Allowance, by China National Intellectual Property Administration, dated Apr. 26, 2022.

* cited by examiner

METHOD FOR PREPARING AMORPHOUS SILICON POWDER FOR ANODE MATERIAL OF LITHIUM ION BATTERY

CROSS-REFERENCE TO RELATED APPLICATIONS

This application claims priority to Chinese Application No. CN202110400316.X, having a filing date of Apr. 14, 2021, the entire contents of which are hereby incorporated by reference.

FIELD

The present invention relates to a kind of methods for preparing an amorphous silicon powder for an anode material of a lithium secondary battery and belongs to the field of electrochemical power supplies.

BACKGROUND

With flourishment of electric cars in the world, performance of lithium ion batteries, regarded as the hearts of the electric cars, directly decides performance such as safety performance, endurance mileage and service life of the electric cars. In order to overcome anxiety on endurance mileage of the electric cars, one of the most effective ways is to carry an electrode material with a high specific capacity, thereby improving the energy density of the battery of the electric car. At current stage, most batteries of the electric cars take graphite with lower mass specific capacity (the theoretical specific capacity is 372 mAh/g) as anodes, and correspondingly, the endurance mileages of the electric cars are restrained. A silicon anode material featuring higher mass specific capacity (the theoretical specific capacity is 4200 mAh/g) and higher lithium intercalated voltage (0.2-0.4V) becomes a next generation of battery anode material with good application prospect. However, with large volume change (greater than 300%) in the lithium intercalating process of the silicon anode material, the electrode material is cracked and structurally destroyed, and the electrolyte enters the cracks of the material to cause problems of increased side reactions, thickened solid electrolyte interfacial film (SEI), increased interface impedance and the like. Furthermore, severe challenge has been brought to the safety of the battery system. The silicon material is amorphized, which contains a lot of 5-10 Å micropores, only three of four $sp^3$ hybridized orbits of silicon atoms located on the inner surfaces of the micropores are bonded, and the remaining one $sp^3$ becomes a dangling bond, and the density of the material reaches $10^{20}/cm^3$. The silicon dangling bonds can eliminate two-phase regions among alloy phases with different lithium concentrations, thereby, even volume expansion is realized. Abundant micropores can "self-absorb" relative volume changes of silicon particles, so that cycle performance of the electrode is improved. It facilitates relief of volume expansion of the silicon material, reduction of degradation speed of the electrode in repeated charging and discharging processes and improvement of cycle stability of the material. Furthermore, due to higher lithium intercalating voltage (~0.4V) of amorphous silicon, formation of lithium dendrites can be inhibited (the forming potential of the lithium dendrites is (~0V), so that the safety performance of the battery is improved. At present, almost all researches on amorphous silicon anodes focus on thin film amorphous silicon, and there are seldom reports on amorphous silicon powders suitable for industrial batch production and with low cost. Major reasons include two aspects: first of all, extremely high degree of supercooling or shearing strength is needed to prepare amorphous silicon, resulting in complicated process, high energy consumption and low purity; and secondly, amorphous silicon is in a metastable state and is likely to be subjected to crystallization when the temperature is higher than 700° C. Thus, when amorphous silicon is subjected to high-temperature sintering, products thereof no longer have the structural characteristics of amorphous silicon. According to analysis above, it is of important value to develop a method for preparing an amorphous silicon powder for an anode material with industrial batch production capacity.

SUMMARY

The present invention is intended to provide a method for preparing an amorphous silicon powder for an anode material of a lithium-ion battery, featuring easy operation, environmental-friendly manufacturing process and low manufacturing cost, with good industrial batch production prospect.

The specific technical scheme of the present invention is described below.

The amorphous silicon powder of the present invention is prepared by ball-milling activation of an amorphous silicon oxide as a raw material to obtain an amorphous silicon oxide fine powder and performing low-temperature vapor phase reduction.

Specifically, the present invention is related to the following contents: amorphous silicon powder: the amorphous silicon powder is prepared by reducing an oxide of silicon, wherein the X-ray diffraction peak of the amorphous silicon material is weak, and the amorphous silicon material is of an amorphous structure.

The structural formula of the oxide of silicon is $SiO_x$, where $0<x\leq2$.

As a preferred scheme, the structural formula of the oxide of silicon is silicon monoxide.

The reduction refers to vapor phase reduction, a vapor phase reduction atmosphere is a mixed gas of hydrogen and carbon monoxide, a reduction temperature ranges from 100° C. to 700° C., and a reduction time ranges from 2 h to 72 h. As a preferred scheme, the reduction temperature is 300° C., and the reduction time is 5 h.

A volume ratio of hydrogen and carbon monoxide in the mixed gas is (0.1-10): 1.

The oxide of silicon is subjected to ball-milling activation before the reduction process, a milling ball material is zirconium oxide or tungsten carbide, a mass ratio of balls to material is (5-30): 1, a ball-milling rotating speed ranges from 100 rpm to 1200 rpm, and a ball-milling time ranges from 1 h to 50 h.

Compared with disclosed methods for preparing a silicon anode material, the present invention is characterized in that.

(1) The structure of silicon powder is in an amorphous state, and compared with crystalline silicon, the relative volume change of the lithium intercalated material is remarkably decreased, and the electrochemical performance thereof can be obviously improved.

(2) The low reduction temperature facilitates maintaining of the crystalline structural characteristics of silicon, thereby preventing the material from being crystallized effectively; in addition, the oxide of silicon has a low oxygen content after being reduced, so that the first efficiency of the silicon anode material can be improved effectively and the consumption of a lithium source or an electrolyte is reduced.

(3) The raw materials are wide in source and low in cost.

(4) The raw materials are green and environmental-friendly, and there are no toxic wastes generated in the preparation process.

(5) A product amorphous silicon powder is high in purity; and (6) The present invention features simple preparation process, simple and easily operated device and low manufacturing cost, and is suitable for scaled production.

DETAILED DESCRIPTION

Detailed description on the technical method of the present invention content is made below in combination with the embodiments and the comparative examples, and further description on the characteristics and beneficial effects of the amorphous silicon powder applied to the anode of the lithium-ion battery in the present invention is made.

Example 1

Figure 1:
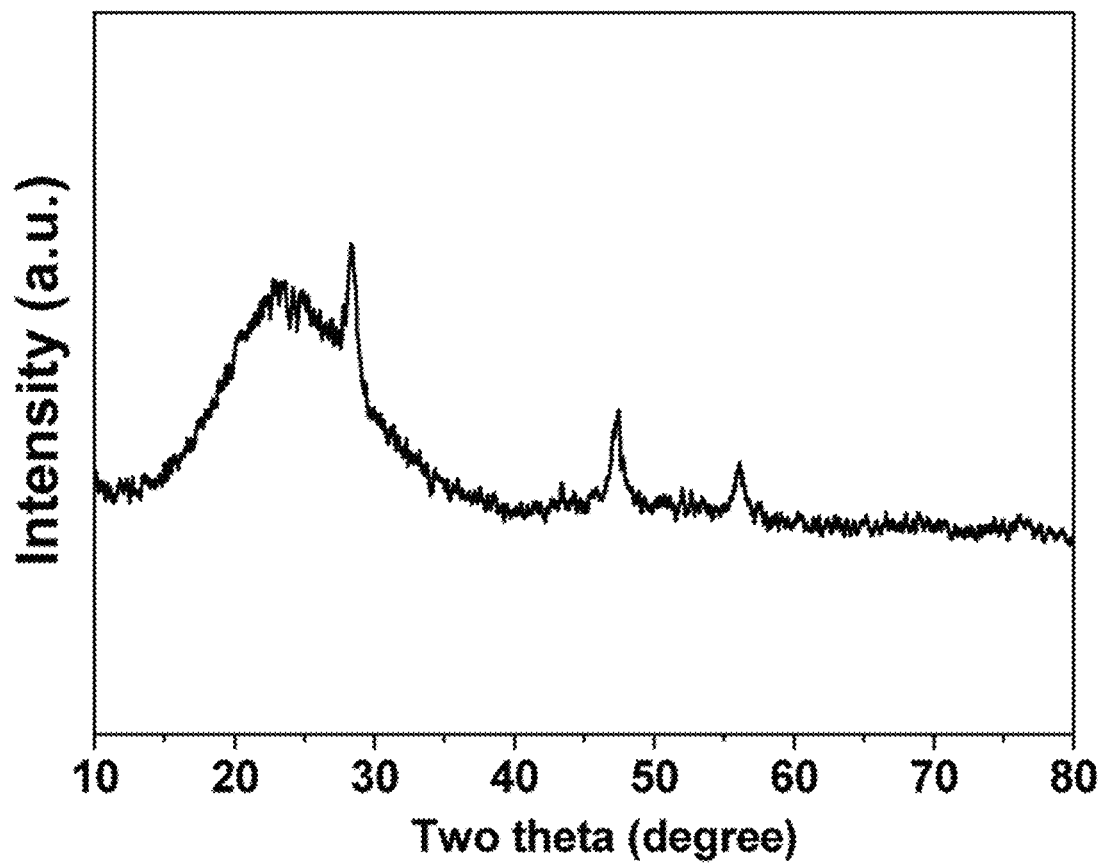
FIG. 1 is an X-ray diffraction pattern of an amorphous silicon powder prepared in an embodiment 1.
Figure 3:
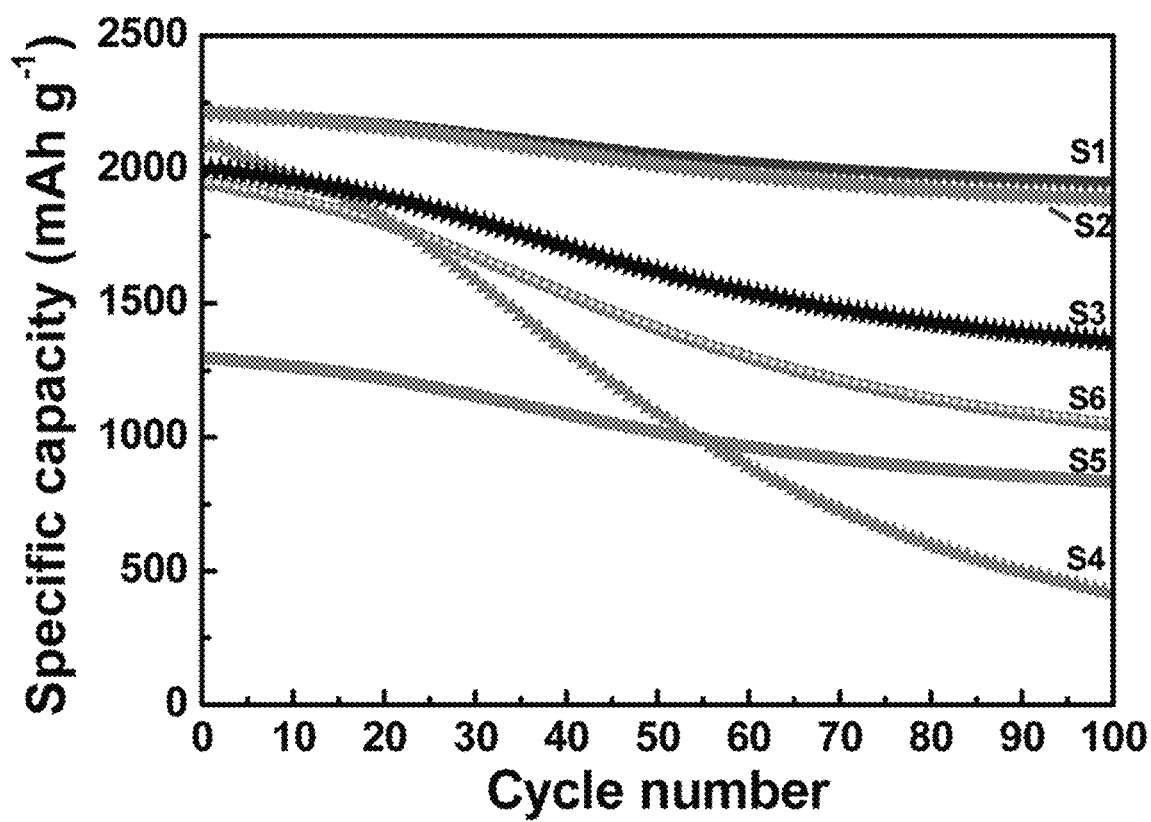
FIG. 3 shows cycle performance curves of electrodes of different materials in an embodiment 5.

5 g of silicon monoxide (average grain diameter-100 nm) was ground on a ball mill (a milling ball material was zirconium oxide), a ratio of balls to material was 20:1, a ball-milling rotating speed was 800 rpm, and a ball-milling time was 2 h. The balls and the material were separated after ball-milling was finished, the powder material was subjected to reduction treatment for 5 h at 300° C. in a mixed atmosphere of hydrogen and carbon monoxide (a volume ratio: 1/1), an X-ray diffraction pattern (XRD) of an obtained product was shown in FIG. 1, and it could be seen from FIG. 1 that the diffraction peak of silicon was weak, and the material was in an amorphous state integrally. The product prepared by the method was marked as S1. Charging and discharging cycle performance of S1 was as shown in FIG. 3, the first charging capacity was 2221 mAg/g, the volume after 100-time cycles was 1954 mAg/g, the capacity retention ratio was 88%, and the cycle stability was good.

Example 2

The reduction time was prolonged, and the rest of treatment methods was as same in the example 1. The balls and the material were separated after silicon monoxide (average grain diameter-100 nm) was subjected to ball-milling, the powder material was subjected to reduction treatment for 10 h at 300° C. in a mixed atmosphere of hydrogen and carbon monoxide (1/1), and the product prepared by the method was marked as S2. Charging and discharging cycle performance of S2 was as shown in FIG. 3. The first charging capacity was 2211 mAg/g, the volume after 100-time cycles was 1890 mAg/g, and the capacity retention ratio was 85%. Compared with the example 1, the reversible capacities were approximate, and the cycle stability was slightly decreased. Prolonging of the reduction time did not further improve the cycle stability of the material. The phenomenon was mainly because of partial crystallization and decrease of defect concentration of the silicon material as a result of increase of the reduction temperature.

Example 3

The reduction temperature was prolonged, and the rest of treatment methods was as same in the example 1. The balls and the material were separated after silicon monoxide (average grain diameter-100 nm) was subjected to ball-milling, and the powder material was subjected to reduction treatment for 5 h at 700° C. in a mixed atmosphere of hydrogen and carbon monoxide (1/1). The product prepared by the method was marked as S3. Charging and discharging cycle performance of the S3 was as shown in FIG. 3. The first charging capacity was 2002 mAg/g, the volume after 100-time cycles was 1492 mAg/g, and the capacity retention ratio was 75%. Compared with the example 1, the reversible capacities were decreased, and the cycle stability was obviously decreased. In combination with trend of the example 2, prolonging of the reduction time and increase of the reduction temperature caused partial crystallization of the silicon material, so that the reversible capacity and the cycle stability were decreased.

Example 4

The reduction temperature was 500° C., the reduction time was 5 h, and the rest of treatment methods was as same in the example 1. The first charging capacity was 2010 mAg/g, the volume after 100-time cycles was 1688 mAg/g, and the capacity retention ratio was 84%.

Example 5

Silicon monoxide was replaced by silicon dioxide, and the rest of treatment methods were as same in the example 1. The first charging capacity was 1980 mAg/g, the volume after 100-time cycles was 1662 mAg/g, and the capacity retention ratio was 84%.

Example 6

Silicon monoxide was replaced by a mixture of silicon dioxide and silicon monoxide, wherein 2 g of silicon dioxide and 3 g of silicon monoxide was used, and the rest of treatment methods were as same in the example 1. The first charging capacity was 1976 mAg/g, the volume after 100-time cycles was 1670 mAg/g, and the capacity retention ratio was 85%.

Example 7

The reduction atmosphere was a mixed gas of hydrogen and carbon monoxide ($H_2/CO=10:1$), and the rest of treatment methods was as same in the example 1. The first charging capacity was 2001 mAg/g, the volume after 100-time cycles was 1720 mAg/g, and the capacity retention ratio was 86%.

Example 8

The reduction atmosphere was a mixed gas of hydrogen and carbon monoxide ($H_2/CO=15:1$), and the rest of treatment methods was as same in the example 1. The first charging capacity was 1880 mAg/g, the volume after 100-time cycles was 1601 mAg/g, and the capacity retention ratio was 85%.

Example 9

The reduction atmosphere was a mixed gas of hydrogen and carbon monoxide ($H_2/CO=0.2:1$), and the rest of treatment methods was as same in the example 1. The first charging capacity was 1988 mAg/g, the volume after 100-time cycles was 1670 mAg/g, and the capacity retention ratio was 84%.

Comparative Example 1

Figure 2:
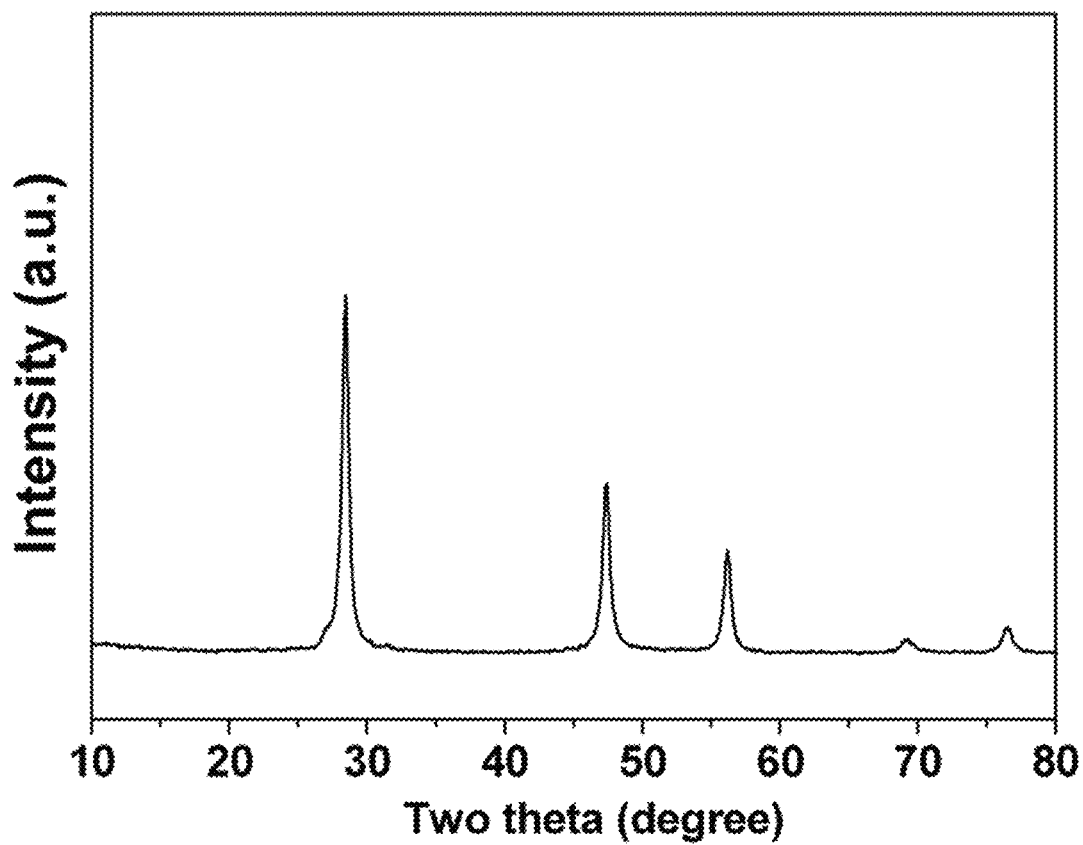
FIG. 2 is an X-ray diffraction pattern of an amorphous silicon powder in a comparative example 1.

The ball-milling material of silicon monoxide was replaced by a nano silicon powder (average grain diameter-100 nm), and the rest of treatment methods was as same in the example 1. X-ray diffraction pattern (XRD) of a product was as shown in FIG. 2, a high strength characteristic diffraction peak of crystalline silicon could be seen, and the material was high in crystallinity. It verified that the silicon raw material (necessarily an amorphous silicon oxide) is of great importance to prepare the amorphous silicon powder successfully. The product prepared by the method was marked as S4. Charging and discharging cycle performance of the S4 was as shown in FIG. 3. The first charging capacity was 2098 mAg/g, the volume after 100-time cycles was 462 mAg/g, and the capacity retention ratio was 22%. Compared with amorphous silicon, cycle stability of the crystalline silicon material was very poor.

Comparative Example 2

A raw material was not subjected to ball-milling activation treatment, and the rest of treatment methods as same in the example 1. The product prepared by the method was marked as S5. Charging and discharging cycle performance of S5 was as shown in FIG. 3. The first charging capacity was 1272 mAg/g, the volume after 100-time cycles was 987 mAg/g, and the capacity retention ratio was 78%. Compared with the example 1, the reversible capacities were obviously decreased. The phenomenon verified that the ball-milling process could activate active sites in the material via negativa, so that the reversible capacity of the material was improved.

Comparative Example 3

A raw material was subjected to reduction treatment at 900° C., and the rest of operating methods as same in the example 1. The product prepared by the method was marked as S6. Charging and discharging cycle performance of S6 was as shown in FIG. 3, the first charging capacity was 1997 mAg/g, the volume after 100-time cycles was 1094 mAg/g, the capacity retention ratio was 55%, and the cycle stability was poor. This showed that the reduction temperature was of great importance to cycle stability of the material.

Comparative Example 4

The reduction atmosphere was hydrogen, and the rest of treatment methods were as same in the example 1. The first charging capacity was 1450 mAg/g, the volume after 100-time cycles was 1140 mAg/g, and the capacity retention ratio was 79%.

Comparative Example 5

The reduction atmosphere was carbon monoxide, and the rest of treatment methods were as same in the example 1. The first charging capacity was 1782 mAg/g, the volume after 100-time cycles was 1362 mAg/g, and the capacity retention ratio was 76%.

Example 10

Capacities and charging and discharging cycle performance of the products in the examples 1-9 and the comparative examples 1-5 were tested with a button cell. A method for preparing the button cell for all samples in the present invention includes: an active substance, acetylene black (CB) and polyvinylidene fluoride (PVDF) were dissolved in N-methyl pyrrolidone (NMP) in a mass ratio of 7:2:1 to prepare slurry; the slurry was scrape-coated to a copper foil; and vacuum drying was conducted for 12 h. A polypropylene (PP) film and an electrolyte (solvent ratio: DMC:EMC:EC=5:3:2, $LiPF_6$ concentration: 1.1 M, 1.5 wt. % of FEC) formed the button cell (CR2025) by taking a metal lithium foil as a counter electrode. A current density in a charging and discharging experiment was 200 mA/g and a voltage range was 0.01-1.5 V. In cycle charging and discharging tests, the capacity retention ratio of the material referred to the post-cycle charging (de-lithiated) capacity/first charging capacity.

The above embodiments are not all the embodiments, and other non-original embodiments put forward by related technicians in the field based on the embodiments of the present invention shall fall within the scope of protection of the present invention. To highlight the beneficial effects of the present invention, a part of process parameters in the examples 2-9 were changed, thereby demonstrating the technical advantages of the example 1 via negativa; compared with the example 1, the amorphous silicon oxide in the comparative example 1 was replaced by crystalline silicon without obtaining the amorphous silicon material; in the comparative example 2, there was no ball-milling activation process, so that the capacity of the material was very low; in the comparative example 3, the reduction temperature was high, so that the cycle stability of the material was very poor; and in the comparative examples 4 and 5, the reduction atmosphere was changed, so that the capacity of the material was very low and the cycle stability was very poor. The above 5 comparative examples demonstrated three critical elements to prepare amorphous silicon involved in the technical scheme via negativa: amorphous silicon oxide raw material, ball-milling activation process and reduction process.

What is claimed is:
1. A method for preparing an amorphous silicon powder for an anode material of a lithium-ion battery, wherein the amorphous silicon powder is prepared by reducing a silicon monoxide, the reduction refers to vapor phase reduction, and a vapor phase reduction atmosphere is a mixed gas of hydrogen and carbon monoxide,
a volume ratio of hydrogen to carbon monoxide in the mixed gas is 1:1,
a reduction temperature is 300° C., and a reduction time is 5 h,
the silicon monoxide is subjected to ball-milling activation on a ball mill before reduction treatment, amass ratio of balls to material is 20:1, a ball-milling rotating speed is 800 rpm, and a ball-milling time is 2 h.

\* \* \* \* \*